3,305,320
PURIFICATION OF ALUMINUM NITRATE BY ALTERNATE MELTING AND CRYSTALLIZATION
Marx E. Weech, Idaho Falls, Idaho, assignor to Phillips Petroleum Company, a corporation of Delaware
Filed July 22, 1963, Ser. No. 296,506
1 Claim. (Cl. 23—305)

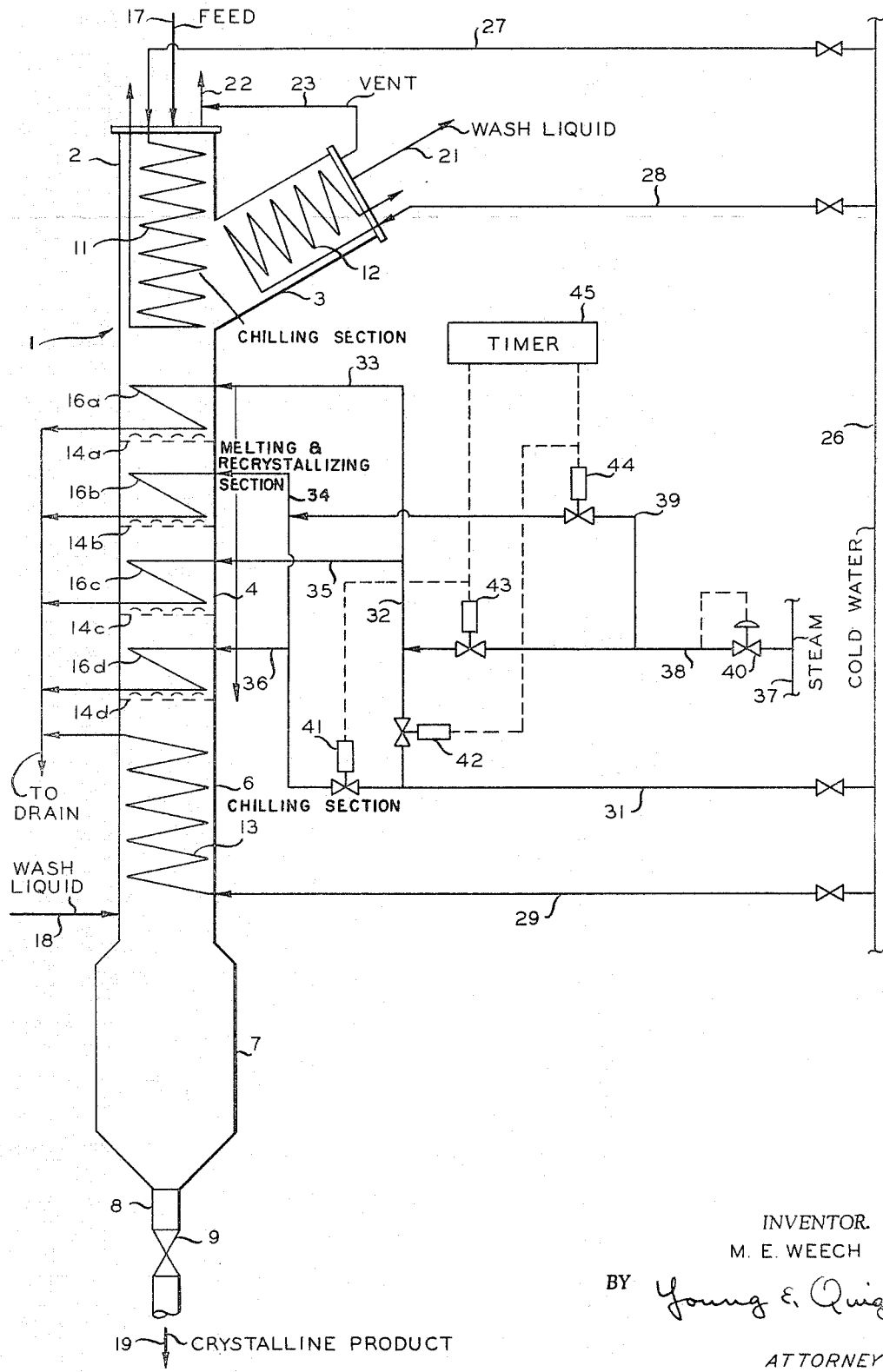

The invention described herein was made or conceived in the course of or under a contract with the U.S. Atomic Energy Commission.

This invention relates to separation and purification of multicomponent mixtures by crystallization. In another aspect, it relates to a process and apparatus for the separation and purification by crystallization of crystallizable material.

The separation and purification of crystallizable materials by the crystallization thereof has been the subject matter of many patents and has enjoyed many commercial applications in the chemical and allied industries. Though many such processes have proven satisfactory, they usually entail complicated and costly crystallization apparatus having movable parts or are limited to batch operations, or require a large amount of equipment and floor space, or are limited to single stage crystallization, or do not have any crystal washing features.

Accordingly, an object of this invention is to provide an improved process and apparatus for the separation and purification by crystallization of crystallizable materials. Another object is to provide a multistage separation and purification process and apparatus which can be operated in a continuous fashion with washing of crystallized material and does not necessitate the use of moving parts. Further objects and advantages of this invention will become apparent to those skilled in the art from the following description, appended claim and accompanying drawing, in which:

The figure is a schematic view in elevation of one embodiment of apparatus used in this invention.

Briefly stated, the improved separation and purification process of this invention comprises introducing feed comprising a crystallizable material, contaminated with impurities or admixed with other materials, into one end of an elongated, vertical zone filled with an inert wash fluid having a different density than said material and in which said material is insoluble or slightly soluble at the conditions of operation, alternately melting and recrystallizing said material as it passes through said zone in contact with a stream of said wash fluid which has an overall countercurrent flow through the zone and is supplied to the said zone at a point remote from said one end of said zone, withdrawing the wash fluid from said one end of said zone together with said impurities and/or other materials, and withdrawing the resulting crystalline material from said other end of said zone.

In a preferred embodiment of said process, a stream comprising crystallizable material is continuously introduced as a melt into the upper end of an elongated, vertical zone filled with wash liquid in which said material is relatively insoluble, said stream is initially chilled to crystallize said material, and the latter is allowed to fall within said zone while it is alternately melted and recrystallized as it passes in contact with a countercurrent stream of said wash liquid which is continuously introduced into the other end of said zone, the wash liquid is withdrawn from the upper end of said zone together with said impurities, etc., and the resulting purified, crystalline material is withdrawn from the lower end of said zone.

One embodiment of apparatus suitable for carrying out said process is that illustrated schematically in the figure.

Referring now to the latter, reference number 1 generally designates an elongated, vertical column, preferably circular in cross section, comprising an upper end or top chilling section 2, a side arm or elbow 3, a melting-recrystallizing section 4 disposed intermediate the ends of the column, a lower end or bottom chilling section 6, a crystal collecting zone 7, and an outlet pipe 8 having a suitable flow control valve 9 disposed therein. Disposed in the upper cooling section 2 is a cooling coil 11. A cooling coil 12 can be disposed in side arm 3 to chill the exit wash liquid and minimize loss of crystallizable material with the withdrawn wash liquid. A cooling coil 13 is disposed in lower cooling section 6 to ensure final recrystallization of the crystallizable material. In the melting-recrystallizing section 4, there is disposed a plurality of vertically spaced, parallel, horizontal, perforated trays 14a, 14b, 14c, 14d or the like, which will retain crystals but not melt. Disposed above or in each of the latter trays or in close proximity thereto is a heat exchange coil such as coil 16a. Feed comprising the crystallizable material is introduced through the top of column 1 via supply line 17. The wash liquid, in which said crystallizable material is insoluble or only slightly soluble at the temperatures of operation, is supplied via line 18 at a point below the lowermost tray 14d, and preferably below chilling coil 13. The crystalline product material 19 is withdrawn via outlet pipe 8. The used wash liquid, containing the impurity or non-crystallized material, is withdrawn from side arm 3 via line 21. Vent lines 22, 23, provided for start-up operations, are connected to the upper end of the column, as shown, and these vent lines can be connected together.

Cold water or other refrigerant can be supplied by a common header 26. This cold water is supplied to cooling coils 11, 12, and 13 by supply lines 27, 28 and 29, respectively. This cold water is also supplied to the heat exchange coils 16a, 16b, 16c, 16d in the melting-recrystallizing section 4 of the column, by lines 31, 32, 33, 34, 35 and 36, when said coils are used for cooling. Steam or other heating medium can be supplied to the process from a common heater 37, and therefrom to lines 33–36 via supply lines 38 and 39 when coils 16a, 16b, 16c, 16d are used for melting. The alternate supply of heating and cooling media to heat exchange coils 16a, 16b, 16c, 16d can be controlled manually, but preferably automatically, such as by suitable solenoid valves 41, 42, 43 and 44, as shown, which can be actuated by one or more conventional timers. Valves 41 and 43 can be normally closed valves and valves 42 and 44 can be normally open valves. Where the heating and cooling stages of each cycle are of equal durations, one timer 45 can be used; alternatively, where one of said stages is longer than the other (in the usual case the cooling—or crystallizing—stage will be longer than the heating—or melting—stage) suitable time delay devices can be used with one timer to provide the proper sequence of operating the heat exchange valves. Alternatively, several timers can be used to obtain the desired time sequence.

In the operation of the apparatus shown in the figures, cold water or other refrigerant is supplied continuously to cooling coils 11, 12 and 13 to maintain the feed inlet or upper chilling section 2, wash liquid withdrawn side arm 3, and lower chilling section 6 at temperatures below the freezing point of the crystallizable material of interest in the wash liquid 17. When the feed is initially introduced into the column, the latter is completely filled with the wash liquid, and the volume of wash liquid displaced by the introduced feed is vented from the column via vent line 21. The wash liquid which is continuously supplied to the column via line 18 is preferably at a temperature below the freezing point of the crystallizable material of interest. Upon introduction of the feed via line 17, the crystallizable material crystallizes and falls under the influence of gravity through the body of the less dense wash liquid in the column and the crystals accumulate on tray 14a. Side arm 3, in the preferred embodiment, is canted or sloped upward as shown to minimize collection of the crystalline material in the side arm as it falls. Initially, cold water is supplied via lines 33 and 35 to the coil 16a, located immediately above the topmost tray 14a, and to coil 16c, respectively. After an appropriate period of time, crystals of the crystalline material collect on the top tray 14a, and preferably stack up to the top of coil 16a, as a liquid permeable bed. When this happens, timer 45 can be actuated so as to switch the normally open valves 42 and 44 to their closed positions and switch the normally closed valves 41 and 43 to their open positions, so that steam is introduced into coil 16a and all subsequent tray coils reverse their temperatures from cold to hot and vice versa. The steam in coil 16a melts the crystalline material collected on tray 14a and since the resulting molten material is more dense than the surrounding wash liquid, it falls through the perforations on the tray. As the molten material enters the cold zone beneath the tray 14a, it recrystallizes and collects on the next tray 14b. This alternate melting and recrystallizing of the crystallizable material is repeated on each tray found in the crystallizer. Timer 45 is programmed to alternately supply cooling and heating mediums through the tray coils. The molten material which passes through the perforations on the last tray 14d is crystallized upon contact with the cold wash liquid supplied via line 18 and by the abstraction of heat caused by the cooling coil 13. The crystalline material collects in collecting zone 7 and can be periodically or continuously withdrawn from outlet 8 by means of valve 9. The wash liquid, which flows countercurrent to the crystallizable material in the column, is removed from side arm 3 via line 21 together with the washed out occluded impurities and/or non-crystallized material, either or both of which can be soluble in the wash liquid.

The instant invention is broadly applicable to the separation and purification by crystallization of multi-component mixtures of components, such as eutectic systems and solid-solution systems to obtain a single, relatively pure component. The mixtures can be organic or inorganic, or combinations of both types of components. For example, it can be employed in the separation of naphthalene from benzene-naphthalene mixtures, the separation of naphthalene from naphthalene-beta-naphthol solid-solution system, the separation of fission products as impurities from atomic reactor wastes, the separation of water (as ice) from food products such as fruit and vegetable juices, milk, wine, beer, coffee, tea and various alcoholic liquors, the purification of amorphous materials such as fats and oils, and the like. Those skilled in the art will recognize the wide applicability of this invention to multi-component mixtures.

The wash fluids that can be employed in this invention also can widely vary. In some cases, the wash fluids can be used to dissolve one or more of the components in the mixture or can be used to simply flush out one or more insoluble components. Where the crystallizable component of interest is normally soluble in the wash fluid, lower operation temperatures can be used to decrease such solubility. Generally, the density of the wash fluid will be different from that of the feed, crystallizable material, and crystals, so that the wash fluid will flow countercurrent. Where the density of the wash fluid is less, the feed will be introduced into the top of the multistage crystallizer and it will fall, as will the melted and recrystallized material, downward through the body of upward-flowing wash fluid. Where the density of the wash fluid is heavier, it will flow downwardly countercurrent to the upward-flowing feed, etc. The feed can be introduced into the body of wash fluid as a melt or liquid or in the form of a solid; where the feed is introduced in the latter form, instead of employing a chilling coil in the feed inlet end of the column, a heating coil can be used to initially melt the solid. In some cases, it may be desirable to introduce the wash liquid as a solution saturated or supersaturated with the crystallizable material of interest, for example, in order to aid the formation of crystallizing nuclei. Further, the wash liquid can be introduced at a plurality of levels and/or different temperatures in the crystallizer column. In some cases it will be desirable to use two or more different wash liquids, each selective for a different component. For example, a wash liquid selective for removing one impurity can be used, and another wash liquid used for removal of a second impurity. The multiple wash liquids can mix in the upper section of the column.

Although I prefer to introduce the feed and wash liquid continuously into the crystallizer column, either or both can be fed intermittently. Distributor rings or the like can be used in introducing the feed and/or wash liquid, where desired. Agitation can be used to distribute the feed and/or to promote crystal growth, as, for example, by placing a motor-driven agitator in the upper chilling section of the column. Usually the top tray in the crystallizer will have a larger holdup than the lower trays. Downcomers can be used on the trays if desired. And though I prefer to use internal heat exchange coils on each tray, and use each one alternatively for melting and chilling, I can use external heat exchange means, such as jackets, for these purposes. Or I can employ electric heating elements for melting and thermoelectric refrigerating elements for chilling. Usually the heat exchange media will be cold water and steam, though other media such as glycol, brine, oil, etc., can be used. Instead of heat exchange coils, heat exchange ribbon (flattened tubes) or even tube bundles can be used on each tray. The number of trays used, their size, shape, etc., can vary of course, and will be dependent on the nature of the feed, purity desired, etc. Insulation materials can be used to maintain proper operating temperatures. The materials used in constructing the crystallizer column will depend on the nature of the feed and wash liquid, the capacity of the column, etc. Pyrex glass spaces can be used between trays to permit visual observation of the tray performance, and where acidic wash liquids are used Pyrex glass, Teflon plastic and austenitic stainless steel (e.g., 304, 347, 316) can be used in constructing the column.

Although not essential, the crystallizer column of this invention can be provided with suitable means to subject the body of liquid and crystals within the column to pulsations and intermittently displace or reverse the normal flow thereof. This can be accomplished by connecting, for example, the lower chilling section to a lateral pipe in which a reciprocating piston is disposed and actuated by means of a motor, rod, and eccentric. The pulsations generated by this system, for example, can alternately displace upwardly the wash liquid and/or melt accumulated on the bottom tray countercurrent to the movement of crystals and pull wash liquid and/or melt downwardly past and through crystals on the tray above. The particular crystals, shape of the pulses, and the relative speed of the downward and upward (or negative and positive) strokes or pulses will determine the relative movement of these materials. Such pulsations can be used to increase the efficiency of the separation.

The following example further illustrates the objects and advantages of this invention, but it should be understood that the various feed and wash liquid materials, temperatures, flow rates, etc., recited in this example are merely illustrative and should not be construed to unduly limit this invention.

As an example, a crystallizer column like that shown in the figure is used in purifying aluminum nitrate contaminated with impurities comprising sodium nitrate, mercuric nitrate, and products of nuclear fission. The aluminum nitrate feed is that resulting from the dissolution of aluminum fuel elements (used in a nuclear reactor) in concentrated nitric acid, and evaporation of the resulting aluminum nitrate solution until it is 3.6 molar (which is essentially molten $Al(NO_3)_3 \cdot 9H_2O$. The column used for separating and purifying this feed by crystallization has a 3″ I.D. and is provided with 4 melting-crystallizing trays each having a height of 1.5″ and nine $\frac{1}{16}$″ holes. The feed comprises 95 wt. percent $Al(NO_3)_3 \cdot 9H_2O$ and 5 wt. percent of 60 wt. percent nitric acid, and it has a density of 1.4 g./cm.³, a temperature of 90°C., and feed rate of 15 g./min. The cold water is used as a refrigerant for the coils in the latter trays and for the two cooling coils in the top of the column and for the one in the lower end of the column, the temperature of the cold water being 20–30° C. Steam which is supplied alternately to the heat exchange coils in the trays has a temperature of about 90° C., which is sufficient to melt the aluminum nitrate crystals which have a melting point at 73° C. The wash liquid used is 60 wt. percent nitric acid, and it is introduced into the column at essentially 0° C., and at a rate of about $\frac{1}{10}$ the feed rate on a volume basis. The cold water and steam are supplied alternately to the heat exchange coils on the trays using a 13.5-min. time cycle from the instigation of the cold cycle, through the cold and hot cycles, and back to the starting point.

Compositions for the aluminum nitrate feed stream, crystalline aluminum nitrate product, and fresh and used nitric acid wash liquid are set forth in Table I.

TABLE I

|  | Density, g./cc. | Moles | | | | Fission products, g./l. | U, g./l. |
|---|---|---|---|---|---|---|---|
|  |  | $Al(NO_3)_3$ | $HNO_3$ | $NaNO_3$ | $Hg(NO_3)_2$ |  |  |
| Feed | 1.60 | 3.5 | 0.1 | 0.0208 | 0.0152 | 1.08 | 1×10⁻³ |
| Fresh nitric acid | 1.373 | 0 | 13.1 | 0 | 0 | 0 | 0 |
| Crystalline product |  | (¹) | 0 | 0 | 0 | 0 | 0 |
| Used nitric acid | 1.43 | 0.027 | 13.0 | 0.0208 | 0.152 | 10.8 | 1×10⁻² |

¹ Crystalline.

Various modifications and alterations of this invention will become apparent to those skilled in the art without departing from the scope and spirit of this invention and it should be understood that this invention is not to be limited unduly to that set forth herein for illustrative purposes.

I claim:

A process for separating and purifying aluminum nitrate from a mixture thereof with impurities, which comprises introducing a melt of said mixture into the upper end of a vertical, elongated zone filled with aqueous nitric acid, crystallizing said aluminum nitrate upon entry of said melt into said zone, alternately melting and recrystallizing said aluminum nitrate as it falls through said nitric acid in contact with a countercurrent stream of said nitric acid introduced into the lower end of said zone at a temperature below the freezing point of aluminum nitrate, withdrawing nitric acid from the upper end of said zone together with said impurities, and withdrawing aluminum nitrate in its crystalline form from the lower end of said zone.

References Cited by the Examiner
UNITED STATES PATENTS

| 1,575,634 | 3/1926 | Mejdell | 23—305 X |
| 2,248,220 | 7/1941 | Dons | 23—270.5 X |
| 3,148,024 | 9/1964 | Hayes | 23—102 X |
| 3,174,832 | 3/1965 | Bohrer | 23—273 |

NORMAN YUDKOFF, *Primary Examiner.*

S. J. EMERY, *Assistant Examiner.*